United States Patent [19]

Flotow

[11] Patent Number: 5,199,542
[45] Date of Patent: Apr. 6, 1993

[54] AIR RELEASING WET CLUTCH

[76] Inventor: Richard A. Flotow, 4859 County Rd. 36A, Butler, Ind. 46721

[21] Appl. No.: 861,303

[22] Filed: Mar. 31, 1992

[51] Int. Cl.⁵ .................. F16D 25/04; F16D 13/56
[52] U.S. Cl. .................. 192/88 A; 192/91 A
[58] Field of Search .................. 192/91 A, 88 A; 188/170

[56] References Cited

U.S. PATENT DOCUMENTS

| | | | |
|---|---|---|---|
| 2,211,191 | 8/1940 | Wolfram | 192/91 A |
| 2,698,676 | 1/1955 | Eason | 192/91 A X |
| 2,860,738 | 11/1958 | Johansen | 188/170 |
| 3,145,816 | 8/1964 | DeLorean et al. | 192/91 A X |
| 3,399,647 | 9/1968 | Alexander et al. | 192/91 A X |
| 3,599,760 | 8/1971 | Moss | 188/170 |
| 3,804,219 | 4/1974 | Cummings | 192/91 A X |
| 4,030,575 | 6/1977 | Moring et al. | 192/91 A X |
| 4,573,561 | 3/1986 | Deem et al. | 192/91 A |
| 4,657,127 | 4/1987 | Boffelli | 192/91 A X |
| 4,708,229 | 11/1987 | Anderson et al. | 192/88 A X |

Primary Examiner—Rodney H. Bonck
Attorney, Agent, or Firm—John H. Crozier; Robert M. Leonardi

[57] ABSTRACT

In a preferred embodiment, a release mechanism for a wet clutch of the type including a clutch pack having interleaved driven and intermediate disks, the driven disks being attached to a rotatable shaft and the intermediate disks being attached to a driven hub, a pressure plate disposed so as to apply clamping pressure to the clutch pack so as to cause the interleaved disks to frictionally engage each other, and a spring to apply the clamping pressure to the pressure plate, the release mechanism including: an air operated diaphragm operatively connected to the pressure plate to draw the pressure plate from the clutch pack and release the clamping pressure therefrom.

4 Claims, 1 Drawing Sheet

AIR RELEASING WET CLUTCH

BACKGROUND OF THE INVENTION

1. Field of the Invention.

The present invention relates to wet clutch mechanisms generally and, more particularly, but not by way of limitation, to a wet clutch mechanism that is released by means of air pressure.

2. Background Art.

Wet clutches have a plurality of friction disks which are employed to provide a large area of frictionally engaging surfaces in a relatively small diameter mechanism. In order to cool the engaging friction surfaces, they are immersed in a bath of oil. Such a clutch and the operation thereof is described in U.S. Pat. No. 4,566,572, issued Jan. 28, 1986, to Flotow et al, titled CLUTCH WITH A PILOTED AND SPRING LOADED DRIVEN DISC HUB, and assigned to the assignee of the present invention, the disclosure of which patent is incorporated by reference hereinto.

Conventionally, such clutches have release mechanisms that are mechanically or hydraulically operated, are relatively expensive, and often have mechanical linkages which require periodic maintenance.

SUMMARY OF THE INVENTION

The present invention overcomes the disadvantages of conventional clutch release mechanisms by providing, in a preferred embodiment, a release mechanism for a wet clutch of the type including a clutch pack having interleaved driven and intermediate disks, the driven disks being attached to a rotatable shaft and the intermediate disks being attached to a driven hub, a pressure plate disposed so as to apply clamping pressure to said clutch pack so as to cause said interleaved disks to frictionally engage each other, and spring means to apply said clamping pressure to said pressure plate, said release mechanism comprising: an air operated diaphragm operatively connected to said pressure plate to draw said pressure plate from said clutch pack and release said clamping pressure therefrom.

BRIEF DESCRIPTION OF THE DRAWING

Understanding of the present invention and the various aspects thereof will be facilitated by reference to the accompanying drawing figure, submitted for purposes of illustration only and not intended to define the scope of the invention, in which.

DETAILED DESCRIPTION OF THE PREFERRED EMBODIMENTS

Figure 1:
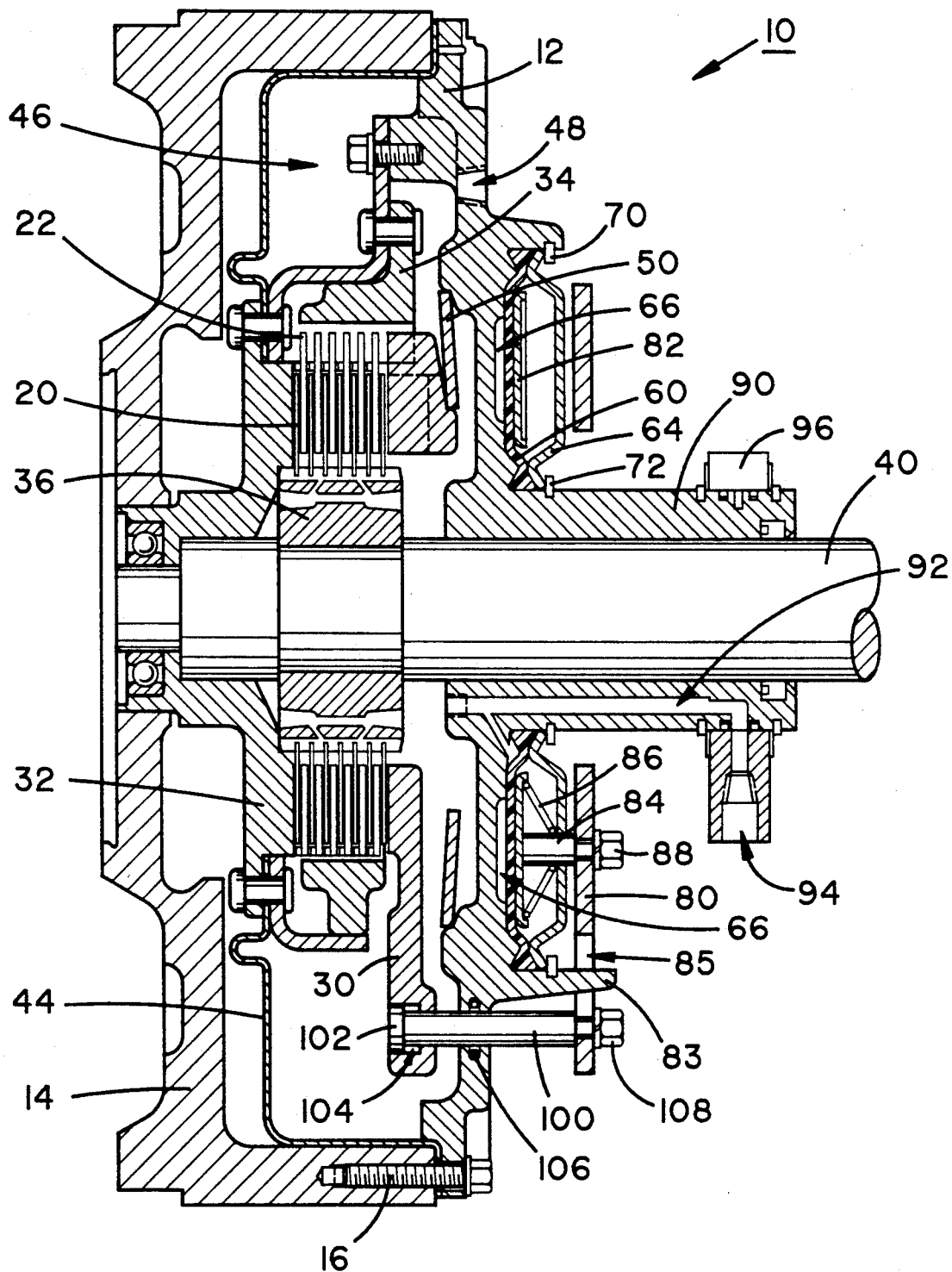
FIG. 1 is a side elevational view, partially in cross-section, of a clutch mechanism constructed according to the present invention.

Referring now to the sole drawing figure, there is illustrated a clutch mechanism constructed according to the present invention, generally indicated by the reference numeral 10.

The conventional elements of clutch mechanism 10 will first be briefly described. Clutch mechanism 10 includes a cover 12 fixedly attached to a flywheel 14 by means of bolts, as at 16. A clutch pack comprising a series of interleaved driven plates, as at 20, and intermediate plates, as at 22, is axially disposed between a pressure plate 30 and an inner clutch member 32. Inner clutch member 32 is fixedly attached to an outer driven hub 34 which is fixedly attached to cover 12.

The inner peripheral edges of driven plates 20 are splined into an inner driven hub 36 which is splined into a shaft 40 disposed centrally of clutch mechanism 10. The outer peripheral edges of intermediate plates 22 engage drive slots in outer driven hub 34 in conventional manner such that there is no relative radial motion therebetween.

A plastic shroud 44 sealingly clamped to inner clutch member 34 and between cover 12 and flywheel 14 defines, together with the cover, an oil chamber 46 into which cooling oil (not shown) may be introduced through oil fill opening 48 (normally closed).

A Belleville washer 50 compressed between the inner surface of cover 12 and pressure plate 30 provides the force to clamp together driven plates 20 and intermediate plates 22 and thereby engage flywheel 14 with shaft 40 for common rotation therewith.

The elements so far described are conventional and it will be understood that, in a conventional clutch mechanism, mechanical or hydraulic means would be provided to unclamp clutch mechanism so that only inner driven hub 36 and driven plates 20 will rotate with shaft 40.

The present invention provides simple means to release clutch mechanism 10 without relying on complicated mechanical linkages or pressurized hydraulic fluid, as is described below.

A annular diaphragm 60 is disposed adjacent the outer surface of cover 12 and has a cover member 64. Defined between diaphragm 60 and the outer surface of cover 12 is an annular air chamber 60 and the outer surface of cover 12 by means of rings 70 and 72, respectively.

Disposed beside the outer surface of diaphragm cover 64 is an annular release plate 80 which is attached to an annular cup-shaped ring 82 by means of a plurality of shoulder bolts, as at 84, welded to the ring. Nuts, as at 88, are threaded on the distal ends of bolts 84 and bear against release plate 80. Ring 82 is held in position against diaphragm 60 by means of a plurality of conical pressure springs, as at 86, through each of which a shoulder bolt 84 passes, the pressure springs being disposed between the ring and diaphragm cover 64 so as to bias apart those elements.

Release plate 80 is locked into cover 12 against relative radial motion therebetween by means of fingers, as at 83, extending orthogonally outwardly from the outer surface of the cover, the fingers radially closely engaging slots, as at 85, defined in the release plate.

Cover 12 includes an elongated cylindrical portion 90 extending along shaft 40, in which cylindrical portion there is defined a channel 92 connecting air chamber 66 behind diaphragm 60 to an inlet 94 in a stationary rotary joint 96. Thus, when inlet 94 is connected to a source of pressurized air (not shown), the air can pass through channel 92 into air chamber 66.

Release plate 80 has passing therethrough a plurality of shoulder bolts, as at 100, the heads, as at 102, of which are disposed in countersunk bores, as at 104, in pressure plate 30. Bolts 100 pass through oil seals, as at 106, in cover 12 to prevent oil from leaking from chamber 46. Nuts, as at 108, are threaded on the distal ends of bolts 100 and bear against release plate 80.

In operation, when clutch mechanism 10 is engaged, as shown in FIG. 1, Belleville washer 50 provides clamping pressure to engage clutch mechanism 10 as described above. When it is desired to disengage clutch mechanism 10, pressurized air is supplied to air chamber 66 through channel 92 and inlet 94. This causes diaphragm 60 to flex outward from cover 12, causing ring 82 to move to the right on FIG. 1 while bolts 84 attached to the ring force release plate 80 to the right. As release plate 80 moves to the right away from cover 12, heads 102 of bolts 100 engage pressure plate 30 and cause it to move to the right, compressing Belleville washer 50 and removing the clamping force from the driven and intermediate disks 20 and 22 in the clutch stack. Conical springs 86 are compressed during this process.

When air pressure is released, Belleville washer 50 will again apply clamping force and the expulsion of air from air chamber 66 will be assisted by the relaxation of conical springs 86.

Gaps are provided in counterbore 104 between the faces of heads 102 and the engaging inner surface of the counterbore to accommodate wearing of friction pads on driven disks 20, which wearing causes pressure plate 30 to move to the left on FIG. 1.

Thus, the present invention provides an air release mechanism for a wet clutch, the mechanism being simple in construction, inherently having a long life, and being virtually maintenance free.

Since certain changes may be made in the above construction without departing from the scope of the invention, it is intended that all matter contained in the above description or shown on the accompanying drawing figure shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A release mechanism for a wet clutch of the type including a clutch pack having interleaved driven and intermediates disks, the driven disks being attached to a rotatable shaft and the intermediate disks being attached to a driven hub, a pressure plate disposed so as to apply clamping pressure to said clutch pack so as to cause said interleaved disks to frictionally engage each other, a clutch cover having an inner surface disposed adjacent said pressure plate and having an outer surface, and spring means to apply said clamping pressure to said pressure plate, said release mechanism comprising:
   (a) an air operated, annular diaphragm sealingly attached to said cover and operatively connected to said pressure plate to draw said pressure plate from said clutch pack and release said clamping pressure therefrom;
   (b) a release plate disposed adjacent said outer surface of said clutch cover and attached to said pressure plate through said cover;
   (c) said air operated diaphragm being disposed between said outer surface and said release plate so as to force said release plate away from said outer surface when air pressure is applied to said diaphragm;
   (d) an annular air chamber defined between said diaphragm and said outer surface; and
   (e) an annular ring disposed against said diaphragm and attached to said release plate by means of a plurality of bolts.

2. An air release mechanism, as defined in claim 1, wherein said release plate is attached to said pressure plate by means of a plurality of bolts.

3. An air release mechanism, as defined in claim 1, wherein said mechanism further comprises:
   (a) a diaphragm cover disposed over said diaphragm between said diaphragm and said release plate;
   (b) said bolts attaching said release plate to said ring pass through said diaphragm cover; and
   (c) a plurality of springs is disposed between said ring and said cover, said springs being compressed when pressurized air is applied to said air chamber, and said springs aiding the expulsion of air from said air chamber when said air is depressurized.

4. An air release mechanism, as defined in claim 3, wherein said springs are conical springs disposed around said bolts attaching said release plate to said ring.

* * * * *